(12) United States Patent
Luo et al.

(10) Patent No.: US 12,051,898 B2
(45) Date of Patent: Jul. 30, 2024

(54) ENERGY TRANSMISSION METHOD, ENERGY ROUTER AND OPERATION CONTROL DEVICE THEREOF, AND STORAGE MEDIUM

(71) Applicant: GREE ELECTRIC APPLIANCES, INC. OF ZHUHAI, Zhuhai (CN)

(72) Inventors: Xiao Luo, Zhuhai (CN); Zhigang Zhao, Zhuhai (CN); Lingjun Wang, Zhuhai (CN)

(73) Assignee: GREE ELECTRIC APPLIANCES, INC. OF ZHUHAI, Zhuhai (CN)

( * ) Notice: Subject to any disclaimer, the term of this patent is extended or adjusted under 35 U.S.C. 154(b) by 468 days.

(21) Appl. No.: 17/435,579

(22) PCT Filed: Aug. 25, 2020

(86) PCT No.: PCT/CN2020/110938
§ 371 (c)(1),
(2) Date: Sep. 1, 2021

(87) PCT Pub. No.: WO2021/114721
PCT Pub. Date: Jun. 17, 2021

(65) Prior Publication Data
US 2022/0060050 A1 Feb. 24, 2022

(30) Foreign Application Priority Data
Dec. 9, 2019 (CN) .......................... 201911250232.1

(51) Int. Cl.
*H02J 13/00* (2006.01)
*G05B 19/042* (2006.01)
(Continued)

(52) U.S. Cl.
CPC ...... *H02J 13/00007* (2020.01); *G05B 19/042* (2013.01); *H02J 13/00002* (2020.01);
(Continued)

(58) Field of Classification Search
CPC .......... H02J 13/00007; H02J 13/00002; G05B 19/042; H04B 3/546; H04L 12/1868; H04L 45/122
(Continued)

(56) References Cited

U.S. PATENT DOCUMENTS 9,373,965 B2 6/2016 Liu et al.
9,825,462 B2 11/2017 Yamagaki
(Continued)

FOREIGN PATENT DOCUMENTS

CN 103248068 A 8/2013
CN 110807714 A 2/2020
(Continued)

OTHER PUBLICATIONS

International Search Report issued Nov. 11, 2020 in PCT/CN2020/110938 filed Aug. 25, 2020, 3 pages.
(Continued)

*Primary Examiner* — Michael R. Fin
(74) *Attorney, Agent, or Firm* — Oblon, McClelland, Maier & Neustadt, L.L.P.

(57) ABSTRACT

The present disclosure provides an energy transmission method, an energy router and an operation control device thereof, and a storage medium, and relates to the field of energy network technology. The energy router of the present disclosure includes a plurality of ports configured to perform at least one of receiving or sending energy and PLC data, energy transmission switches, each of the energy transmission switches is configured to control open and closed states of one port of, and a routing processor configured to determine an energy transmission path according to the PLC data and stored routing information, determine a corresponding port associated with the energy transmission path, and turn on an energy transmission switch of the corre-
(Continued)

sponding port, for the energy outputting from the corresponding port.

18 Claims, 6 Drawing Sheets

(51) Int. Cl.
    *H04B 3/54*       (2006.01)
    *H04L 12/18*     (2006.01)
    *H04L 45/122*    (2022.01)
    *H04L 67/125*    (2022.01)

(52) U.S. Cl.
    CPC ......... *H04B 3/546* (2013.01); *H04L 12/1868* (2013.01); *H04L 45/122* (2013.01); *H04L 67/125* (2013.01); *G05B 2219/2639* (2013.01); *H04L 2212/00* (2013.01)

(58) Field of Classification Search
    USPC ........................................................ 307/1, 18
    See application file for complete search history.

(56) References Cited

U.S. PATENT DOCUMENTS

| | | |
|---|---|---|
| 2015/0155710 A1 | 6/2015 | Yamagaki |
| 2016/0049794 A1 | 2/2016 | Liu et al. |
| 2016/0131686 A1 | 5/2016 | Handley et al. |
| 2017/0207627 A1* | 7/2017 | Ichino ........................ H02J 3/00 |
| 2018/0046208 A1 | 2/2018 | Handley et al. |
| 2018/0219377 A1 | 8/2018 | Laval et al. |
| 2018/0219381 A1 | 8/2018 | Laval et al. |
| 2020/0228164 A1* | 7/2020 | Hunsinger .............. H02M 3/24 |

FOREIGN PATENT DOCUMENTS

| | | |
|---|---|---|
| CN | 110829606 A | 2/2020 |
| CN | 110890971 A | 3/2020 |
| CN | 210836207 U | 6/2020 |
| CN | 211720331 U | 10/2020 |

OTHER PUBLICATIONS

Tsuguhiro Takuno, et al., "In-home Power Distribution Systems by Circuit Switching and Power Packet Dispatching," 2010 First IEEE International Conference on Smart Grid Communications, Nov. 2010, 5 pages.

Hui Guo, et al., "MatchmakingTradeoffBasedMinimumLossRoutingAlgorithminEnergyInternet," Automation of Electric Power Systems, vol. 42, No. 14, Jul. 25, 2018, pp. 172-179 (with English Abstract).

Extended European Search Report issued on Dec. 21, 2022 in European Patent Application No. 20897835.3, 8 pages.

\* cited by examiner

EICT/EIP protocol framework

ENERGY TRANSMISSION METHOD, ENERGY ROUTER AND OPERATION CONTROL DEVICE THEREOF, AND STORAGE MEDIUM

CROSS-REFERENCE TO RELATED APPLICATIONS

The present disclosure is a U.S. National Stage Application under 35 U.S.C. § 371 of International Patent Application No. PCT/CN2020/1110938, filed on Aug. 25, 2020, which is based on and claims priority to the China Patent Application No. 201911250232.1 filed on Dec. 9, 2019, the disclosure of both of which are incorporated by reference in its entirety into the present application.

TECHNICAL FIELD

The present disclosure relates to the field of energy network technology, in particular to an energy transmission method, an energy router and an operation control device thereof, and a storage medium.

BACKGROUND

The similarities between electric current and water flow include that: untraceable, the flow direction is uncontrollable, and electricity or water may flow spontaneously so long as there is a path and so long as there is a drop in height. Based on such characteristic, in the current centralized power system, power transmission and supply are realized by utilizing a drop in electric energy. In the centralized energy network, the energy router can realize passive flow direction control and energy inverting conversion such as Alternating Current (AC)—Directing Current (DC) conversion and voltage conversion.

SUMMARY

According to one aspect of some embodiments of the present disclosure, an energy router is provided. The energy router comprises: a plurality of ports configured to perform at least one of receiving or sending energy and Power Line Communication (PLC) data; an energy transmission switch configured to control open and closed states of the plurality of the ports; and a routing processor configured to determine an energy transmission path according to the PLC data and stored routing information, determine a corresponding port associated with the energy transmission path, and turn on an energy transmission switch of the corresponding port, for outputting the energy from the corresponding port.

In some embodiments, the energy router further comprises at least one of the following: an energy metering processor configured to collect energy information of each of the ports; or an energy conversion processor located between the ports, and configured to perform at least one function of alternating current conversion or voltage conversion.

In some embodiments, the energy router further comprises a trans-voltage conversion processor configured to receive a message of the PLC data from a port of the plurality of ports and send to the routing processor, and encapsulate the energy transmission path generated by the routing processor into a message of the PLC data according to an output voltage.

In some embodiments, the route processor is configured to: determine a target address according to the PLC data; determine an energy transmission path based on a shortest path algorithm according to the stored routing information; determine a next-hop address according to the energy transmission path; and determine a port connected to the next-hop address as the corresponding port.

In some embodiments, the route processor is further configured to: send broadcast information to other energy routers through the plurality of ports in the case that an energy transmission path is failed to be determined according to the stored routing information; and update the stored routing information according to received path feedback, wherein the energy router that receives the broadcast message feeds back routing information stored therein and associated with the target address; and determine an energy transmission path according to the stored routing information which is updated.

In some embodiments, the energy router further comprises a data processor including: a data processor, the data processor comprising: an application layer sub-processor configured to generate application data, and analyze application data from a transmission layer sub-processor, wherein application data comprises at least one of energy data, control data, state data, or fault data; the transmission layer sub-processor configured to encapsulate a transmission layer data packet according to a application data and a predetermined transmission layer protocol, and analyze a transmission layer data packet from a network layer sub-processor; the network layer sub-processor configured to generate a network layer data packet according to a transmission layer data packet, a Media Access Control (MAC) address and an Energy Internet Protocol (EIP) address, and analyze a network layer data packet from a link layer sub-processor; and the link layer sub-processor configured to generate a message of the PLC data according to the network layer data packet, and analyze a message of the PLC data from an energy network.

In some embodiments, the message of the PLC data comprises: PLC header information, comprising a PLC communication technology identification; EIP header information, comprising a source EIP address and a target EIP address; Energy Information Communication Technology (EICT) header information, including a source MAC address, a target MAC address, a serial number, a protocol type and a check information; and the application data.

According to one aspect of some embodiments of the present disclosure, an energy network is provided. The energy network comprises: a plurality of energy routers according to any energy routers above; and a plurality of end nodes, each of which is a user node or a power plant node, wherein each of the energy routers is connected to at least two of nodes from a group consist of other energy routers of the plurality of energy routers and the plurality of end nodes.

According to one aspect of some embodiments of the present disclosure, an energy transmission method is provided. The method comprises the steps of: receiving Power Line Communication (PLC) data and energy, wherein the PLC data comprises a target address; determining an energy transmission path according to the PLC data and stored routing information; determining a corresponding port associated with the energy transmission path, and turning on an energy transmission switch of the corresponding port; and outputting electric energy, which is received by the energy router, from the corresponding port, wherein the energy router comprises a plurality of ports.

In some embodiments, the energy transmission method further comprises: metering at least one of a real-time energy output of a source address of the energy or a real-time energy input of a target address of the energy, according to a duration when each port is turned on and an average power during a transmission process.

In some embodiments, the energy transmission method further comprises: performing at least one of alternating current conversion or voltage conversion according to an energy attribute of a port of the plurality of ports which input energy and an energy attribute of a port which output energy, wherein the energy attribute comprises direct current, alternating current, and voltage value.

In some embodiments, the energy transmission method further comprises: extracting application data in a message of the PLC data before alternating current conversion and voltage conversion and after extracting the message of the PLC data from a port of the plurality of ports, to determine the energy transmission path according to the stored routing information; and re-encapsulating the application data into a message of the PLC data and outputting through a port which output energy.

In some embodiments, the determining an energy transmission path according to the PLC data and the stored routing information comprises: determining a target address according to the PLC data; and determining an energy transmission path based on a shortest path algorithm according to the stored routing information; the determining a corresponding port associated with the energy transmission path comprises: determining a next-hop address according to the energy transmission path; determining a port connected to the next-hop address as the corresponding port.

In some embodiments, the determining an energy transmission path according to the PLC data and the stored routing information further comprises: sending broadcast information to other energy routers through the plurality of ports in the case that an energy transmission path is failed to be determined according to the stored routing information, and updating the stored routing information according to received path feedback, wherein the energy router that receives the broadcast message feeds back routing information stored therein and associated with the target address; and determining an energy transmission path according to the stored routing information which is updated.

In some embodiments, the energy transmission method further comprises: generating the message of the PLC data, comprising: generating application data by an application layer sub-processor, wherein the application data comprises at least one of energy data, control data, state data, or fault data; encapsulating a transmission layer data packet by a transmission layer sub-processor according to the application data and a predetermined transmission layer protocol; generating a network layer data packet by a network layer sub-processor according to the transmission layer data packet, a Media Access Control (MAC) address and an Energy Internet Protocol (EIP) address; and generating a message of the PLC data by a link layer sub-processor according to the network layer data packet.

In some embodiments, the energy transmission method further comprises: reading the message of the PLC data, comprising: obtaining the message of the PLC data from an energy network through the link layer sub-processor; analyzing a network layer data packet from the link layer sub-processor by the network layer sub-processor; analyzing a transmission layer data packet from the network layer sub-processor by the transmission layer sub-processor; and analyzing application data from the transmission layer sub-processor by the application layer sub-processor, wherein the application data comprises at least one of energy data, control data, state data, or fault data.

In some embodiments, the message of the PLC data comprises: PLC header information, comprising a PLC communication technology identification; EIP header information, comprising a source EIP address and a target EIP address; Energy Information Communication Technology (EICT) header information, including a source MAC address, a target MAC address, a serial number, a protocol type and a check information; and the application data.

According to one aspect of some embodiments of the present disclosure, an operation control device of an energy router is provided. The device comprises a memory; and a processor coupled to the memory, wherein the processor is configured to implement the method according to any of the above-described embodiments.

According to one aspect of some embodiments of the present disclosure, a computer-readable storage medium is provided. The computer-readable storage medium has computer program instructions stored thereon, which, when executed by a processor, implement the steps of the method according to any of the above-described embodiments.

BRIEF DESCRIPTION OF THE DRAWINGS

The accompanying drawings described here are intended to provide a further understanding of the present disclosure and constitute a part of the present disclosure. The illustrative embodiments of the present disclosure as well as the descriptions thereof, which are intended for explaining the present disclosure, do not constitute improper definitions on the present disclosure. In the accompanying drawings.

DETAILED DESCRIPTION

The technical solution according to the present disclosure will be further described in detail below by way of the accompanying drawings and embodiments.

Figure 1A:
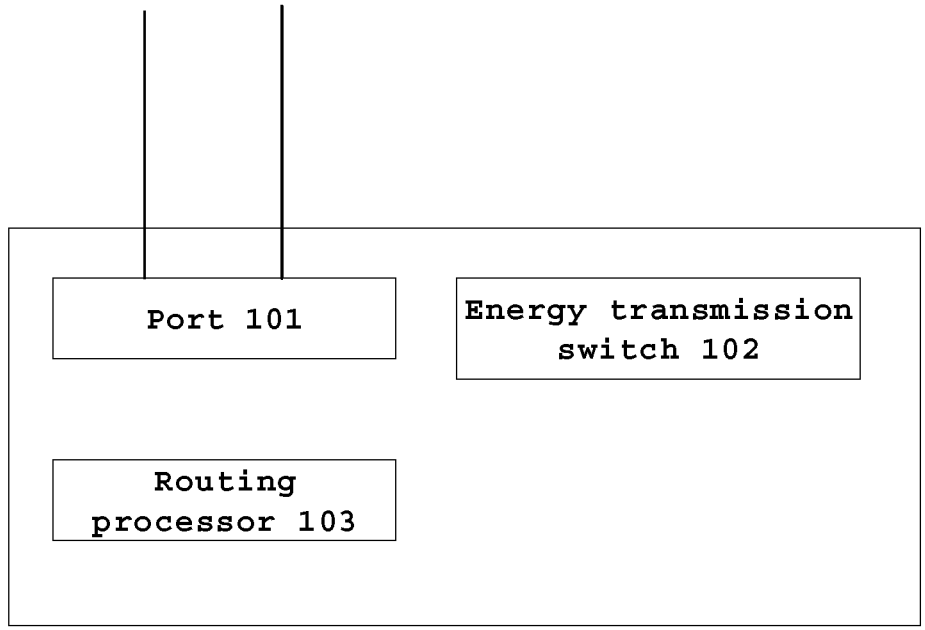
FIG. 1A is a schematic view of some embodiments of the energy router according to the present disclosure.

A schematic view of some embodiments of the energy router according to the present disclosure is shown in FIG. 1A. The energy router includes:

a plurality of ports 101, wherein each of the ports 101 is a channel for energy transmission between the energy router and outside, which enables energy and PLC data to be input to the energy router or output from the energy router, or both.

In some embodiments, the same link is used in the transmission of PLC data in the energy network as energy to be transmitted and interacted.

Energy transmission switches 102, which are capable of controlling the open and closed states of the ports. In some embodiments, the each of the energy transmission switches is controlled according to the inflow or outflow of energy, such that the port in the current energy router that is located in the transmission path is turned on, so as to implement controlling the flow direction of the energy. In some embodiments, PLC energy transmission instructions from other energy routers, control terminals, or routing processors may be received when energy transmission is determined. When a PLC energy transmission instruction is received, an energy transmission switch is turned on; when a PLC energy transmission completed instructions from other energy routers, control terminals or routing processors is received, the energy transmission switch is turned off. In some embodiments, the number of the energy transmission switches 102 may match the number of the ports, such that each energy transmission switch controls the on/off of one port.

A routing processor 103, which is capable of determining an energy transmission path according to the PLC data and the stored routing information. In some embodiments, the routing processor 103 can determine a target address according to the PLC data; determine an energy transmission path and then determine a next-hop address based on a shortest path algorithm according to the stored routing information. In some embodiments, the routing processor turns on the energy transmission switch of a port of the ports according to the determined corresponding port associated with the energy transmission path, so that the electrical energy input to the energy router is output from the corresponding port that is turned on.

Such energy router can receive energy and PLC data, plan a transmission path for the energy according to the PLC data, and turn on the ports in the transmission path for energy transmission, so that the energy can be flexibly transmitted in the energy network, thereby facilitating the transaction of electric energy and improving the flexibility of energy interaction.

In some embodiments, the routing processor 103 includes an energy path storage unit and an optimal path selecting unit. The energy path storage unit can store the shortest path of energy transmission within the system network. When there is a new energy transmission path, the new energy transmission path is directly stored in the energy path storage unit. When there is a subsequent new energy transmission path with a shorter path, the energy path storage unit is updated. The optimal path selecting unit selects the shortest energy transmission path from the energy path storage unit. Such energy router not only improves the path planning efficiency but also continuously optimizes the transmission path, thereby reducing energy loss during the transmission process.

In some embodiments, the routing processor 103 is a processor chip that performs a routing calculation function. In some embodiments, the routing processor 103 is implemented by Field Programmable Gate Array (FPGA).

In some embodiments, the routing processor 103 sends broadcast information to other routers through the ports in the case that a transmission path is failed to be generated according to the stored routing information, and the energy router that receives the broadcast message feeds back a routing information stored by the same and associated with the target address; an energy transmission path is determined according to the updated routing information. The routing processor 103 updates the stored routing information according to the received path feedback, and further determines an energy transmission path and then determines a next-hop address and an output port based on the shortest path algorithm according to the updated routing information, and then turns on the energy transmission switch of the output port.

Such energy router can obtain routing information from other network nodes by way of broadcast information, and further supplement own stored network topology in the case where own network topology information is incomplete, thereby improving the probability of success in planning an energy transmission path, and improving the energy transmission efficiency.

Figure 1B:
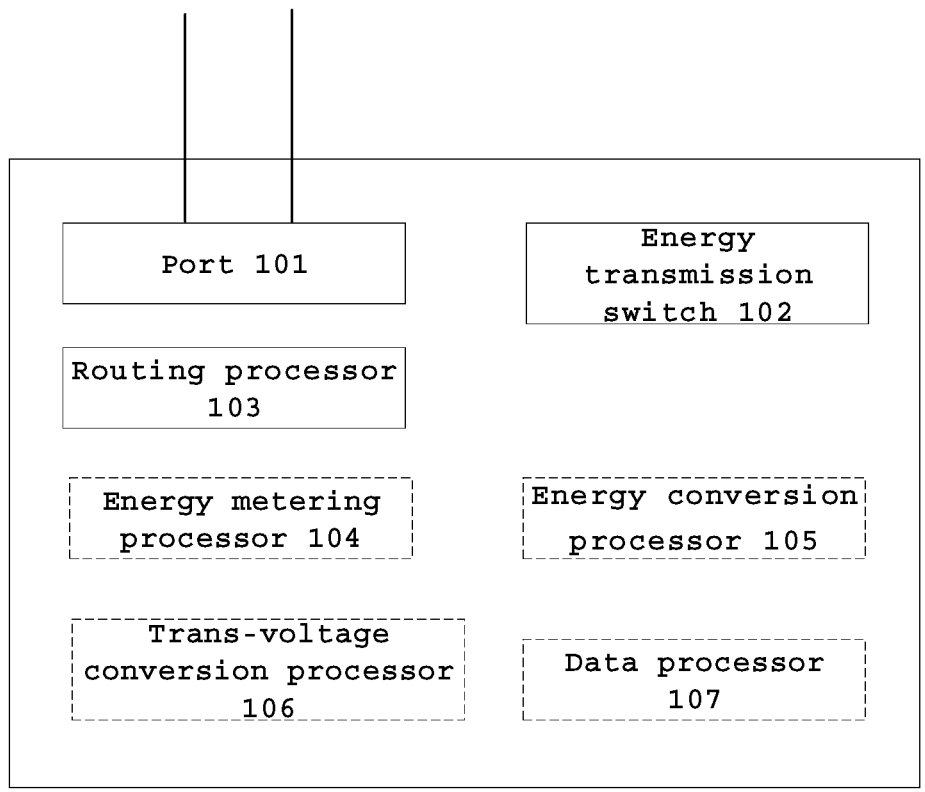
FIG. 1B is a schematic view of other embodiments of the energy router according to the present disclosure.

In some embodiments, as shown in FIG. 1B, the energy router further includes an energy metering processor 104. The energy metering processor 104 is capable of collecting energy information of each port of the ports. In some embodiments, the energy metering processor 104 meters a quantity of electricity flowing into or out of each port. In some embodiments, during the energy transmission, within the time period from turn-on to turn-off of an energy transmission switch, a duration t is recorded, and an average power p during the transmission time period is multiplied by the time t to calculate a quantity of electricity within the time period, so that it is possible to further meter the energy transmitted. In some embodiments, the PLC data includes information such as a target address, a source address, a transmission capacity, and a real-time voltage/current/power of the energy. Based on a collection result of the energy metering processor 104 for each port and in conjunction with the information in the PLC data, the end-to-end energy transmission information is collected. In some embodiments, the energy metering processor 104 may be a processor chip. In some embodiments, the energy metering processor 104 may be implemented by FPGA.

In some embodiments, as shown in FIG. 1B, the energy router further includes an energy conversion processor 105 located between the ports and performing at least one function of AC conversion or voltage conversion. Since the voltage and AC/DC conditions at two ends of the energy router are not necessarily the same, it is necessary to perform energy conversion, for example, converting 400V to 48V or the like. In some embodiments, the energy conversion processor 105 realizes the mutual conversion functions between AC and DC, and between high and low voltages. In some embodiments, the energy conversion processor 105 is an inverter. In some embodiments, the energy conversion processor 105 may be a processor chip. In some embodiments, the energy conversion processor 105 may be implemented by FPGA.

Such energy router can take the problem of different network environments on two sides of the energy transmission network into account, thereby expanding the application range of the energy router.

In some embodiments, as shown in FIG. 1B, the energy router further includes a trans-voltage conversion processor 106. In the case of crossing voltages, the PLC data is confronted the problem of voltage coupling. That is, energy data cannot be directly transmitted across voltages, and the carrier characteristic will disappear after the transforming conversion, so that it is impossible to reflect the energy data. In some embodiments, the energy data on two sides of different voltages is bridged by adding inductance by means of voltage coupling or current coupling. Such energy router can avoid the loss of PLC data caused by crossing voltages, and ensure the reliability of data transmission in the energy network. In some embodiments, the trans-voltage conversion processor 106 may be a processor chip. In some embodiments, the trans-voltage conversion processor 106 may be implemented by FPGA.

In other embodiments, the trans-voltage conversion processor 106 receives a message of the PLC data from a port of the ports, and sends the same to the routing processor; and encapsulates the energy transmission path generated by the routing processor into a message of the PLC data according to the output voltage. The input terminal of the trans-voltage conversion processor 106 is located between the input port of the energy router and the input terminal of the energy conversion processor 105 for electrical energy, and the output terminal of the trans-voltage conversion processor 106 is located between the output port of the energy router and the output terminal of the energy conversion processor 105 for electrical energy, thereby separating the PLC data from electrical energy and avoiding data loss during the voltage conversion process. In some embodiments, the PLC data is processed as needed, for example generating new source EIP addresses and target EIP addresses, and attaching the same to a transmission protocol message, and then transmitting the new protocol message as the voltage on the other side, thereby implementing updating the PLC data and improving the flexibility of data transmission.

In some embodiments, as shown in FIG. 1B, the energy router further includes a data processor 107, which is capable of forming an energy information communication transmission and energy Internet protocol framework based on an architectural division of an application layer, a transmission layer, a network layer, and a link layer. In some embodiments, the data processor 107 may be one or more processor chips. In some embodiments, the trans-voltage conversion processor 106 may be implemented by FPGA.

Figure 2:
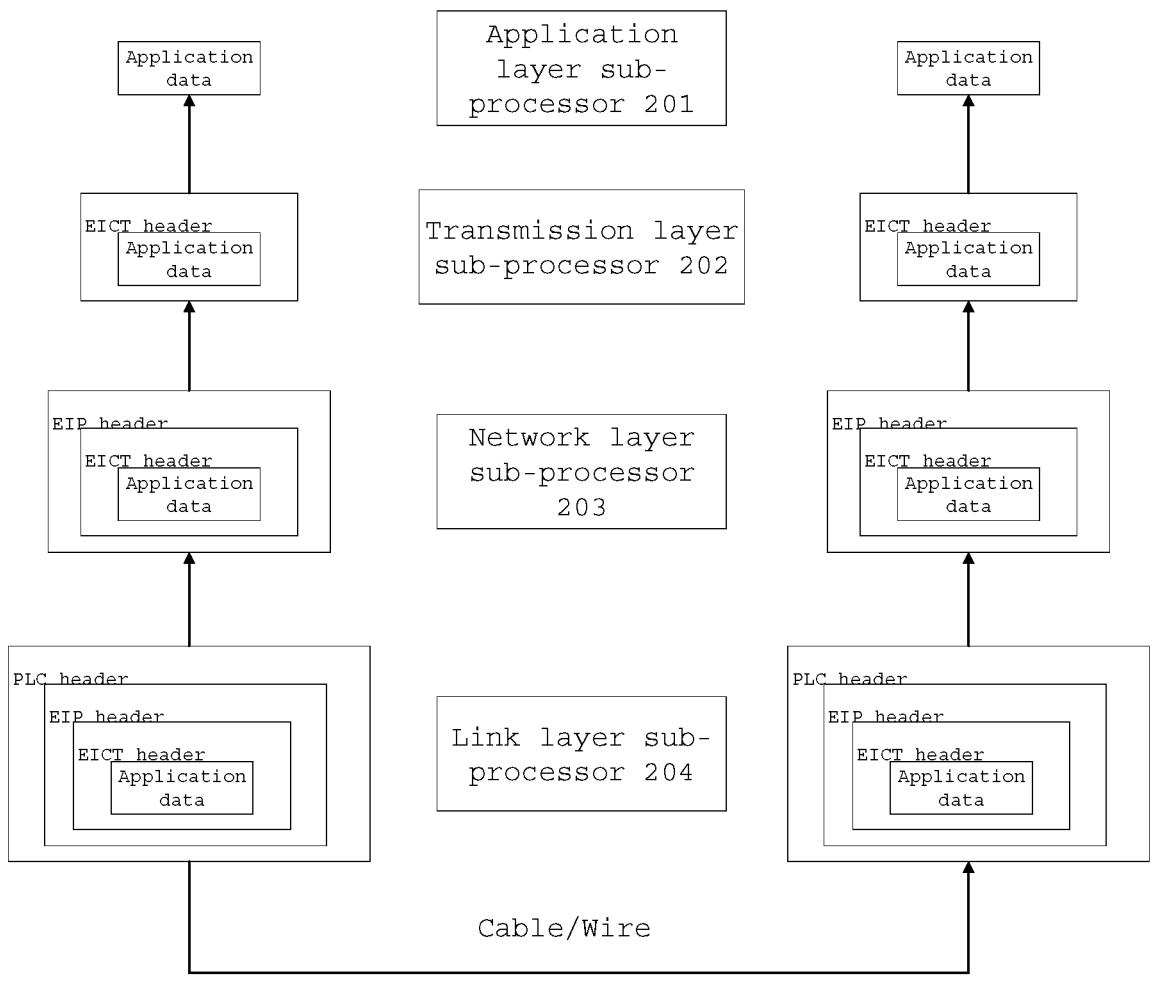
FIG. 2 is a schematic view of some embodiments of the data processor of the energy router according to the present disclosure.

In some embodiments, as shown in FIG. 2, the data processor 107 includes:

an application layer sub-processor, which is capable of generating application data and analyzing application data from a transmission layer sub-processor. The application data includes at least one of energy data, control data, state data, or fault data;

the transmission layer processor, which is capable of encapsulating a transmission layer data packet according to the application data and the predetermined transmission layer protocol, and also capable of analyzing a transmission layer data packet from a network layer sub-processor. In some embodiments, the transmission layer sub-processor compatibly supports CAN, Modbus, BACNet, LonWorks and so on;

the network layer sub-processor, which is capable of generating a network layer data packet according to a transmission layer data packet, a MAC address and an EIP address, and also capable of analyzing a network layer data packet from a link layer sub-processor;

the link layer sub-processor, which is capable of generating message of the PLC data based on the network layer data packet, and also capable of analyzing message of the PLC data from the energy network.

Figure 3:
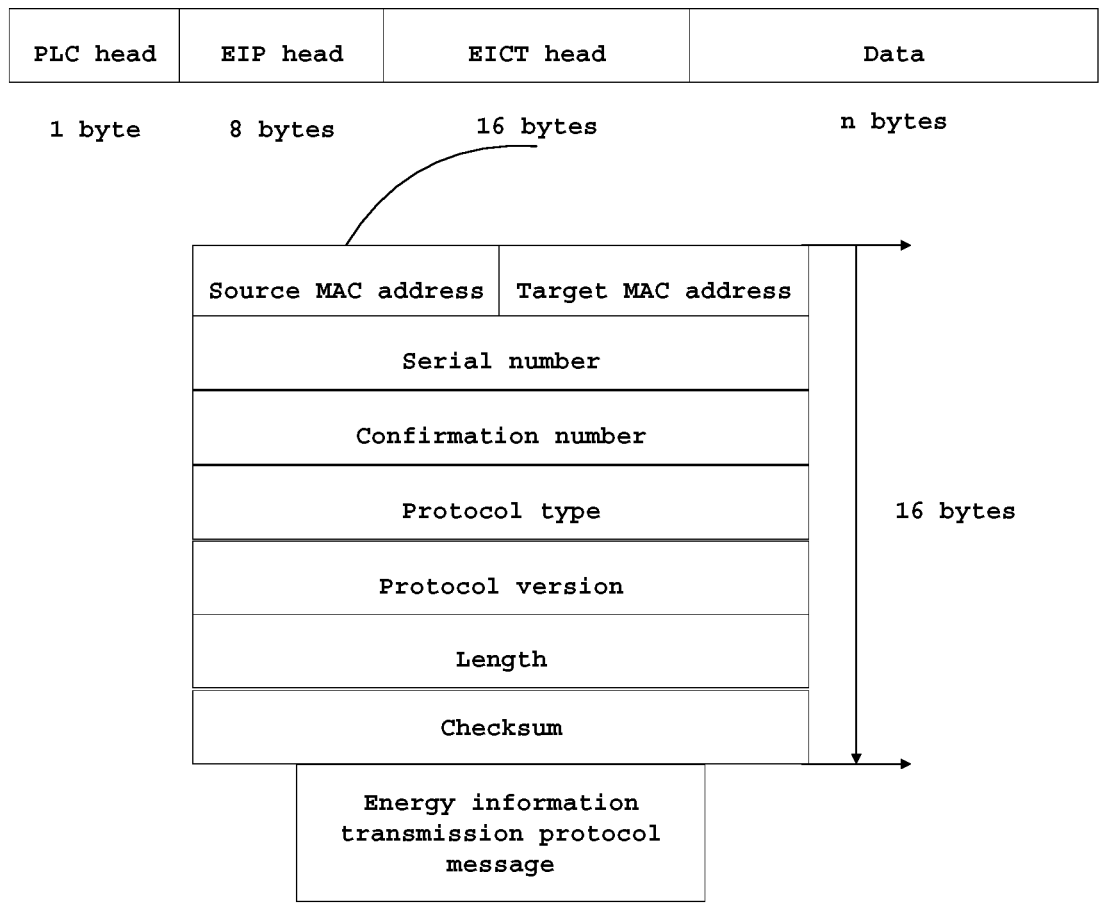
FIG. 3 is a schematic view of some embodiments of the message of the PLC data according to the present disclosure.

During the actual process of transmitting the energy data, each layer of data is encapsulated from top to bottom to form a data packet. The final data packet will reflect information such as application data, a source MAC address, a target MAC address, a source EIP address, a target EIP address, a protocol type and checksum as shown in FIG. 3. In some embodiments, each of the above-described sub-processors may be a processing chip, and the sub-processors are mutually connected to one another to form a data processor.

Such energy router takes a hierarchical architecture of IP network as a reference, and ensures the feasibility and reliability of data transmission by way of layered processing shown in FIG. 2 during the process of data generation, analysis, and transmission.

In some embodiments, the message of the PLC data as shown in FIG. 3 includes:

PLC header information. In some embodiments, the PLC communication technology identifier occupies 1 byte to identify the PLC communication technology adopted by the energy information;

EIP header information, which includes a source EIP address and a target EIP address. In some embodiments, the EIP header information occupies 8 bytes, wherein the source EIP address and the target EIP address each occupy 4 bytes. The EIP address is configured to identify a unique address in the system network;

EICT header information, which includes a source MAC address, a target MAC address, a serial number, a protocol type, and check information. In some embodiments, the EICT header information occupies 16 bytes, the source MAC address and the target MAC address each occupy 4 bytes, the serial number, the confirmation number, the protocol type, and the protocol version each occupy 1 byte, and the length and the checksum each occupy 2 bytes. The MAC address is configured to identify a unique device in the system network;

An application data field, which includes one or more of energy data, control data, state data or fault data as needed.

Such data message format can cooperate with the hierarchical architecture of the energy router to ensure the feasibility and reliability of data transmission, and improve the flexibility of content of data transmission.

Figure 4:
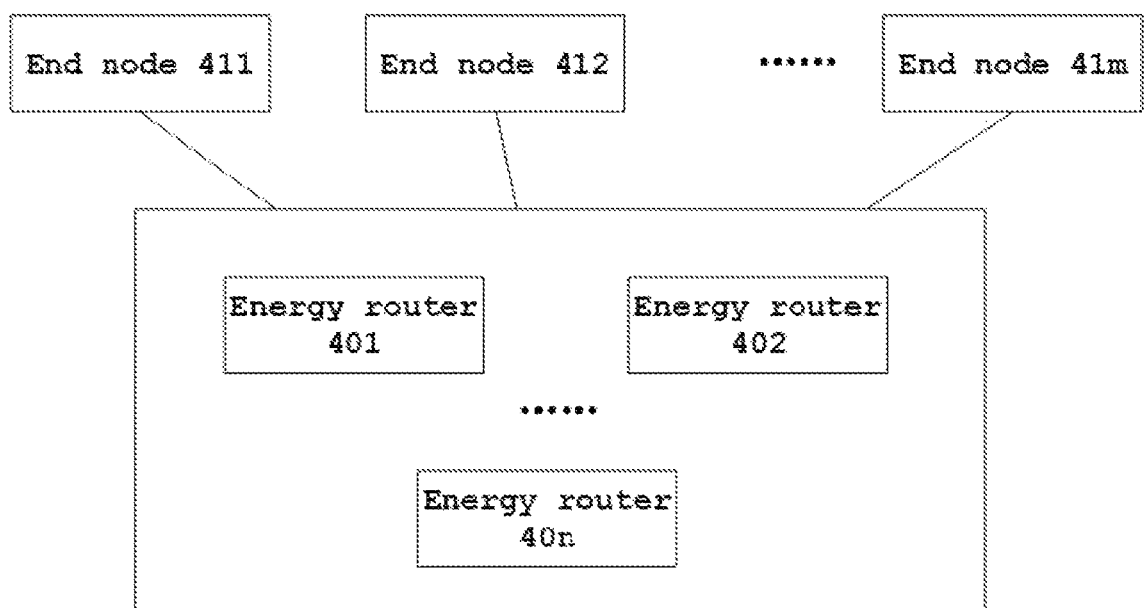
FIG. 4 is a schematic view of some embodiments of the energy network constructed with the energy router according to the present disclosure.

In some embodiments, the energy routers are connected to each other and connected to a plurality of end nodes to form the energy network as shown in FIG. 4. The energy network includes a plurality of end nodes 411~41 m, wherein m is a positive integer. In some embodiments, the end node is a power plant node or a user node and the like, which is capable of performing at least one of generating electric energy or consuming electric energy. The energy network includes the energy routers 401-40 n according to any of the above-described embodiments, wherein n is a positive integer. Each energy router is connected to at least two nodes of a group consist of the end nodes and the other energy routers, to form an energy network topology.

Such energy network can transmit energy and PLC data. The energy router can plan a transmission path for the energy according to the PLC data, and turn on the ports in the transmission path for energy transmission, so that the energy can be flexibly transmitted on the energy network, thereby facilitate electricity trading and improving the flexibility of energy exchanging.

Figure 5:
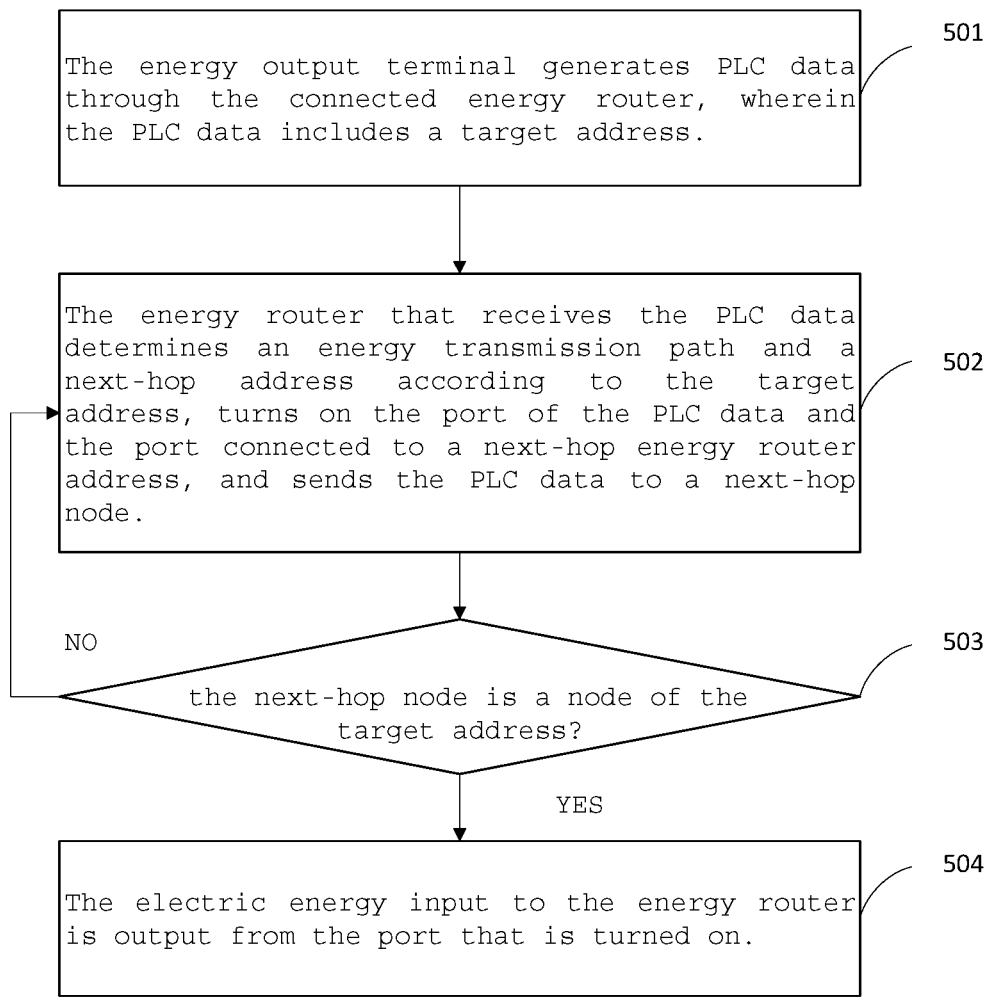
FIG. 5 is a flowchart of some embodiments of the energy interaction method based on an energy router.

In some embodiments, based on the energy network, a flowchart of some embodiments of the energy interaction method is shown in FIG. 5.

In step 501, the energy output terminal generates PLC data through the connected energy router. In some embodiments, the PLC data includes a target address. The PLC data also includes a source address, a next-hop address, a number of energy interactions and so on.

In step 502, the energy router that receives the PLC data determines an energy transmission path and a next-hop address according to the target address, turns on the input port of the PLC data and the port connected to a next-hop energy router address, and sends the PLC data to a next-hop node.

In step 503, after the PLC data is received, it is determined whether the next-hop node is a node of the target address. If it is the node of the target address, thus planning of the entire path is completed, and perform step 504; if it is not the node of the target address, continue to perform the step 502.

In step 504, power transmission is performed according to a path where the energy router is turned on.

In some embodiments, the PLC data is transmitted synchronously with the electrical energy to be interacted, and a section of circuit is turned on as a next-hop node is determined, and after a target node is determined, the electrical energy reaches the target node.

In other embodiments, the PLC data is transmitted firstly, and after the path from the source terminal to the target terminal is turned on, the power transmission is performed.

By way of such method, the energy and PLC data in the energy network can be received, and the energy router plans a transmission path for the energy according to the PLC data, and turns on the ports in the transmission path for energy transmission, so that the energy can be flexibly transmitted in the energy network, thereby facilitating the transaction of electric energy and improving the flexibility of energy exchanging.

Figure 6:
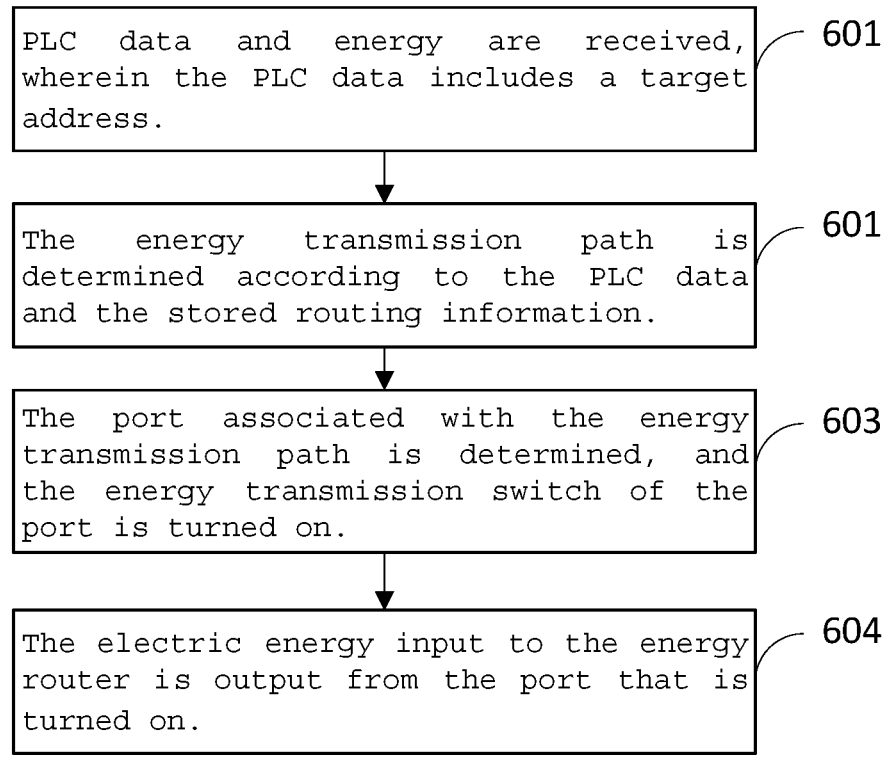
FIG. 6 is a flowchart of some embodiments of the energy transmission method according to the present disclosure.

A flowchart of some embodiments of the energy transmission method according to the present disclosure is shown in FIG. 6.

In step 601, PLC data and energy are received, wherein the PLC data includes a target address. In some embodiments, the PLC data also includes a source address and a capacity of energy transmission.

In step 602, the energy transmission path is determined according to the PLC data and stored routing information. In some embodiments, the target address is determined according to the PLC data, the energy transmission path is determined and then a next-hop address is determined based on a shortest path algorithm and the stored routing information.

In step 603, according to the determined port associated with the energy transmission path, the energy transmission switch of the port is turned on, so that the electrical energy input to the energy router is output from the port that is turned on.

In step 604, the electric energy input to the energy router is output from the port that is turned on.

By way of such method, the energy router can receive the energy and PLC data, and plan a transmission path for the energy according to the PLC data, and turn on the ports in the transmission path for energy transmission, so that the energy can be flexibly transmitted in the energy network as needed, thereby facilitating the transaction of electric energy and improving the flexibility of energy interaction.

In some embodiments, the energy router meters at least one of a real-time energy output of the source address or a real-time energy input of the target address of the energy according to a duration when each port is turned on and an average power during the transmission process. In some embodiments, the energy router meters a quantity of electricity flowing into or out of each port. For example, during the energy transmission, within the time period from turn-on to turn-off of the energy transmission switch, the duration t is recorded, and the average power p during the transmission time period is multiplied by the time t to calculate a quantity of electricity within the time period, so that it is possible to further meter the energy transmitted.

By way of such method, it is possible to accurately meter energy input and output in the distributed energy network, and ensure fair transactions between users.

In some embodiments, the energy router performs at least one of AC conversion or voltage conversion according to an energy attribute of the energy input port and an energy attribute of the energy output port, wherein the energy attribute includes DC, AC, and voltage values. By way of such method, it is possible to take into account the problem of different network environments on two sides of the energy transmission network, thereby expanding the application range of the energy router.

In some embodiments, the energy router extracts a message of the PLC data from the port and then extracts the application data in the message before AC conversion and voltage conversion, so as to determine an energy transmission path according to the stored routing information; and re-encapsulates the application data into a message of the PLC data and outputs the same through the energy output port. By way of such method, it is possible to extract the PLC data during the voltage conversion process, thereby avoiding the loss of PLC data caused by crossing voltages and ensuring the reliability of data transmission in the energy network; and thereby implementing updating the PLC data and improving the flexibility of data transmission.

In some embodiments, the energy router sends broadcast information to other routers through the ports in the case that a transmission path is failed to be generated according to the stored routing information, and the energy router that receives the broadcast message feeds back the routing information stored by the same and associated with the target address. The energy router that sends broadcast information updates the stored routing information according to the received path feedback, and determines an energy transmission path according to the updated routing information.

By way of such method, the energy router can obtain routing information from other network nodes by way of broadcast information, and further supplement own stored network topology in the case that own network topology information is incomplete, thereby improving the probability of success in planning an energy transmission path, and improving the energy transmission efficiency.

Figure 7:
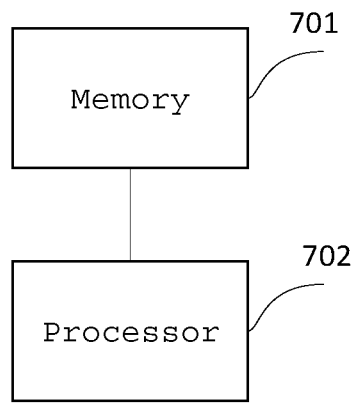
FIG. 7 is a schematic view of some embodiments of the operation control device of the energy router according to the present disclosure.

A schematic view of the structure of one embodiment of the operation control device of the energy router according to the present disclosure is shown in FIG. 7. The operation control device of the energy router includes a memory 701 and a processor 702. Wherein: the memory 701 is a magnetic disk, a flash memory or any other non-volatile storage medium. The memory is configured to store instructions in the corresponding embodiments of the energy transmission method described above. The processor 702 is coupled to the memory 701 and implemented as one or more integrated circuits, for example a microprocessor or a microcontroller. The processor 702 is configured to execute instructions stored in the memory, which enables the energy to be flexibly transmitted in the energy network as needed, facilitates transaction of electric energy, and improves the flexibility of energy interaction.

Figure 8:
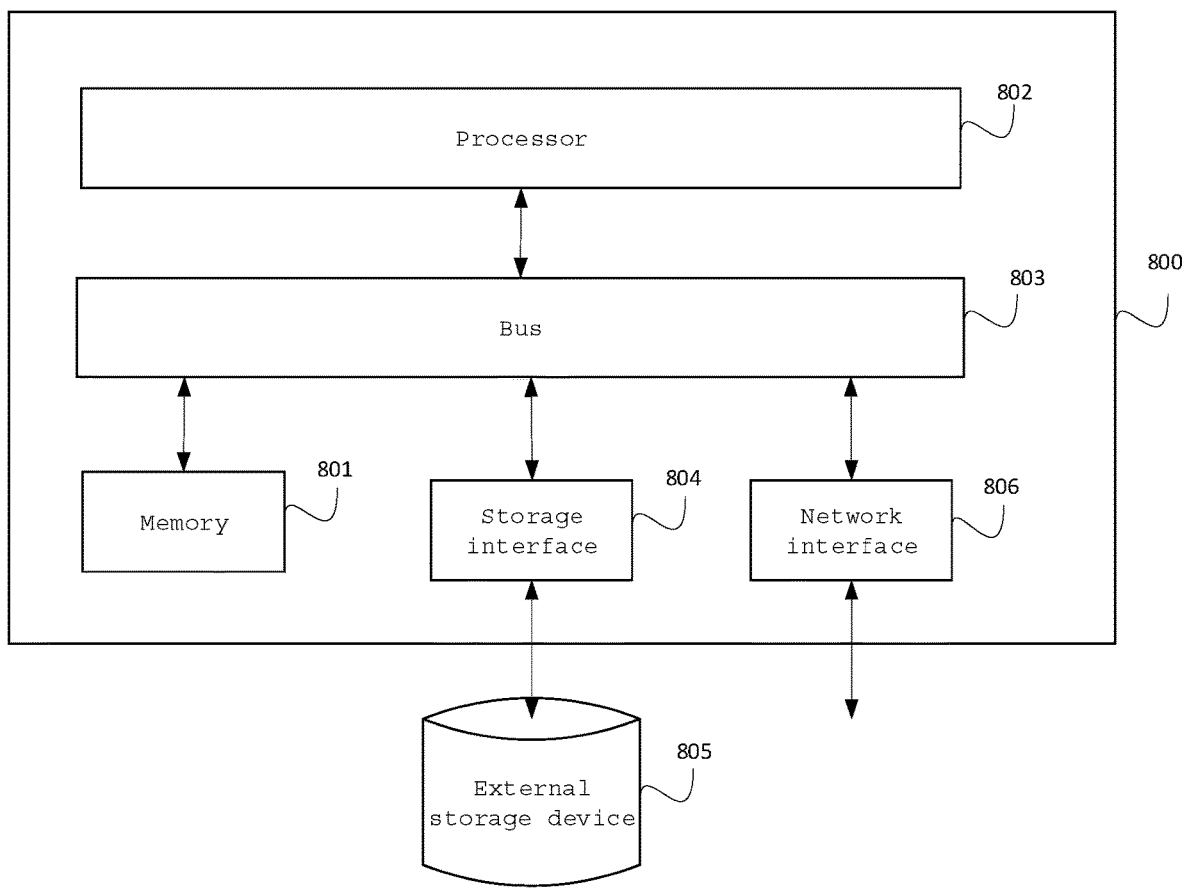
FIG. 8 is a schematic view of other embodiments of the operation control device of the energy router according to the present disclosure.

In one embodiment, as shown in FIG. 8, the operation control device 800 of the energy router includes a memory 801 and a processor 802. The processor 802 is coupled to the memory 801 via a bus 803. The operation control device 800 of the energy router can also be connected to the external storage device 805 via a storage interface 804 for calling external data, and can also be connected to the network or another computer system (not shown) via a network interface 806. Detailed introduction will not be repeated here.

In this embodiment, by storing data instructions in the memory and processing the above-described instructions in the processor, it is possible to enable energy to be flexibly transmitted in the energy network as needed, which facilitates the transaction of electrical energy and improves the flexibility of energy interaction.

In another embodiment, a computer readable storage medium has stored thereon computer program instructions which, when executed by a processor, implement the steps of the method in the corresponding embodiments of the energy transmission method. It is to be understood by those skilled in the art that the embodiments according to the present disclosure can be provided as a method, device, or computer program product. Accordingly, the present disclosure can take the form of a complete hardware embodiment, a complete software embodiment, or an embodiment combining software and hardware. Moreover, the present disclosure can take the form of a computer program product implemented in one or more computer-usable non-transitory storage media (including but not limited to disk memory, CD-ROM, optical memory, and the like) containing computer usable program codes therein.

The present disclosure is described with reference to the flow charts and/or block diagrams of the methods, devices (systems), and computer program products according to the embodiments according to the present disclosure. It is to be appreciated that each flow and/or block in the flow charts and/or block diagrams as well as a combination of flows and/or blocks in the flow charts and/or block diagrams can be realized by a computer program instruction. These computer program instructions can be provided to a processor of a general purpose computer, a special purpose computer, an embedded processing machine, or other programmable data processing devices to produce a machine, such that the instructions executed by a processor of a computer or other programmable data processing devices produce a device for realizing a designated function in one or more flows in the flow charts and/or one or more blocks in the block diagrams.

These computer program instructions can also be stored in a computer readable memory capable of guiding a computer or other programmable data processing device to operate in a particular manner, such that the instructions stored in the computer readable memory produce a manufacture including an instruction device. The instruction device realizes a designated function in one or more steps in the flow charts or one or more blocks in the block diagrams.

These computer program instructions can also be loaded onto a computer or other programmable data processing devices, such that a series of operational steps are performed on the computer or other programmable device to produce a processing realized by computer, such that the instructions executed on the computer or other programmable devices provide steps for realizing a designated function in one or more steps of the flow charts and/or one or more blocks in the block diagrams.

Hitherto, the present disclosure has been described in detail. Some details well known in the art are not described in order to avoid obscuring the concept according to the present disclosure. According to the above description, those skilled in the art can fully understand how to implement the technical solutions disclosed here.

The method and device according to the present disclosure can be implemented in many ways. For example, the method and device according to the present disclosure is implemented by software, hardware, firmware, or any combination of software, hardware, and firmware. The above-described sequence for the steps of the method is merely for illustrative purposes, and the steps of the method according to the present disclosure are not limited to the sequence specifically described above unless otherwise specified. Further, in some embodiments, the present disclosure is also be embodied as programs recorded in a recording medium, which include machine readable instructions for implementing the method according to the present disclosure. Thus, the present disclosure also covers a recording medium that stores programs for performing the method according to the present disclosure.

Finally, it should be noted that: the above embodiments are only intended to describe the technical solution according to the present disclosure rather than limiting the same. Although detailed explanations are made to the present disclosure by referring to preferred embodiments, it is to be appreciated by those of ordinary skill in the art that: it is still possible to make amendments to the specific embodiments according to the present disclosure or make equivalent replacements to some of the technical features, which on the premise of not departing from the spirit and scope according to the present disclosure shall all be encompassed in the scope of the technical solution for which protection is sought in the present disclosure.

What is claimed is:

1. An energy router, comprising:
   a plurality of ports configured to perform at least one of receiving or sending energy and Power Line Communication (PLC) data;
   energy transmission switches, each of the energy transmission switches is configured to control open and closed states of one port of the plurality of the ports; and
   a routing processor configured to determine an energy transmission path according to the PLC data and stored routing information, determine a corresponding port associated with the energy transmission path, and turn on an energy transmission switch which controls the corresponding port, for outputting the energy from the corresponding port,
   wherein the routing processor is configured to:
      determine a target address according to the PLC data;
      determine an energy transmission path based on a shortest path algorithm according to the stored routing information;
      determine a next-hop address according to the energy transmission path; and
      determine a port connected to the next-hop address as the corresponding port.

2. The energy router according to claim 1, further comprising at least one of the following:
   an energy metering processor configured to collect energy information of each of the ports; or
   an energy conversion processor located between the ports and configured to perform at least one function of alternating current conversion or voltage conversion.

3. The energy router according to claim 1, further comprising:
   a trans-voltage conversion processor configured to receive a first message of the PLC data from a port of the plurality of ports and send to the routing processor, and encapsulate the energy transmission path generated by the routing processor into a second message of the PLC data according to an output voltage.

4. The energy router according to claim 1, wherein determining an energy transmission path based on a shortest path algorithm according to the stored routing information comprises:

sending broadcast information to other energy routers through the plurality of ports in the case that an energy transmission path is failed to be determined according to the stored routing information; and updating the stored routing information according to received path feedback, wherein the energy router that receives a broadcast message feeds back routing information stored therein and associated with the target address; and determining an energy transmission path according to the stored routing information which is updated.

5. The energy router according to claim 1, further comprising a data processor, the data processor comprising:

an application layer sub-processor configured to generate a first application data, and analyze a second application data from a transmission layer sub-processor, wherein the first and second application data separately comprise at least one of energy data, control data, state data, or fault data;

the transmission layer sub-processor configured to encapsulate a first transmission layer data packet according to the first application data and a predetermined transmission layer protocol, and analyze a second transmission layer data packet from a network layer sub-processor;

the network layer sub-processor configured to generate a first network layer data packet according to the first transmission layer data packet, a Media Access Control (MAC) address and an Energy Internet Protocol (EIP) address, and analyze a second network layer data packet from a link layer sub-processor; and the link layer sub-processor configured to generate a first message of the PLC data according to the first network layer data packet, and analyze a second message of the PLC data from an energy network.

6. An energy network, comprising:
a plurality of energy routers according to claim 1; and
a plurality of end nodes, each of which is a user node or a power plant node,
wherein each of the energy routers is connected to at least two of nodes from a group consist of other energy routers of the plurality of energy routers and the plurality of end nodes.

7. An energy transmission method, comprising:
receiving Power Line Communication (PLC) data and energy, wherein the PLC data comprises a target address;
determining an energy transmission path according to the PLC data and stored routing information;
determining a corresponding port associated with the energy transmission path, and turning on an energy transmission switch of the corresponding port; and
outputting electric energy, which is received by an energy router, from the corresponding port, wherein the energy router comprises a plurality of ports,
wherein the determining the energy transmission path according to the PLC data and the stored routing information comprises:
determining a target address according to the PLC data; and
determining an energy transmission path based on a shortest path algorithm according to the stored routing information, and
wherein the determining the corresponding port associated with the energy transmission path comprises:
determining a next-hop address according to the energy transmission path; and
determining a port connected to the next-hop address as the corresponding port.

8. The energy transmission method according to claim 7, further comprising:
metering at least one of a real-time energy output of a source address of the energy or a real-time energy input of a target address of the energy, according to a duration when each port is turned on and an average power during a transmission process.

9. The energy transmission method according to claim 8, further comprising:
performing at least one of alternating current conversion or voltage conversion according to an energy attribute of a port of the plurality of ports which input energy and an energy attribute of a port which output energy, wherein the energy attribute comprises direct current, alternating current, and voltage value.

10. The energy transmission method according to claim 9, further comprising:
extracting application data in a message of the PLC data before alternating current conversion and voltage conversion and after extracting the message of the PLC data from a port of the plurality of ports, to determine the energy transmission path according to the stored routing information; and
re-encapsulating the application data into a message of the PLC data and outputting through a port which output energy.

11. The energy transmission method according to claim 7, wherein the determining an energy transmission path according to the PLC data and the stored routing information further comprises:
sending broadcast information to other energy routers through the plurality of ports in the case that an energy transmission path is failed to be determined according to the stored routing information, and updating the stored routing information according to received path feedback, wherein the energy router that receives a broadcast message feeds back routing information stored therein and associated with the target address; and
determining an energy transmission path according to the stored routing information which is updated.

12. The energy transmission method according to claim 7, further comprising:
generating a message of the PLC data, comprising:
generating a first application data by an application layer sub-processor, wherein the first application data comprises at least one of energy data, control data, state data, or fault data;
encapsulating a first transmission layer data packet by a transmission layer sub-processor according to the first application data and a predetermined transmission layer protocol;
generating a first network layer data packet by a network layer sub-processor according to the first transmission layer data packet, a Media Access Control (MAC) address and an Energy Internet Protocol (EIP) address; and
generating a first message of the PLC data by a link layer sub-processor according to the first network layer data packet.

13. The energy transmission method according to claim 7, further comprising:
reading a message of the PLC data, comprising:
obtaining a second message of the PLC data from an energy network through link layer sub-processor;

analyzing a second network layer data packet from the link layer sub-processor by a network layer sub-processor;

analyzing a second transmission layer data packet from the network layer sub-processor by a transmission layer sub-processor; and analyzing a second application data from the transmission layer sub-processor by an application layer sub-processor, wherein the second application data comprises at least one of energy data, control data, state data, or fault data.

14. The energy transmission method according to claim 12, wherein the message of the PLC data comprises:

PLC header information, comprising a PLC communication technology identification;

EIP header information, comprising a source EIP address and a target EIP address;

Energy Information Communication Technology (EICT) header information, including a source MAC address, a target MAC address, a serial number, a protocol type and a check information; and the application data.

15. An operation control device of an energy router, comprising:

a memory; and a processor coupled to the memory which, based on instructions stored in the memory, is configured to:

receive Power Line Communication (PLC) data and energy, wherein the PLC data comprises a target address;

determine an energy transmission path according to the PLC data and stored routing information;

determine a corresponding port associated with the energy transmission path, and turning on an energy transmission switch of the corresponding port; and output electric energy, which is received by the energy router, from the corresponding port, wherein the energy router comprises a plurality of ports, wherein the processor is further configured to determine the energy transmission path according to the PLC data and the stored routing information by being further configured to:

determine a target address according to the PLC data; and determine an energy transmission path based on a shortest path algorithm according to the stored routing information, and wherein the processor is further configured to determine the corresponding port associated with the energy transmission path by being further configured to:

determine a next-hop address according to the energy transmission path; and determine a port connected to the next-hop address as the corresponding port.

16. A computer-readable storage medium having stored thereon computer program instructions, wherein the instructions, when executed by a processor, implement steps of the method according to claim 7.

17. The operation control device of an energy router according to claim 15, wherein the processor is further configured to:

meter at least one of a real-time energy output of a source address of the energy or a real-time energy input of a target address of the energy, according to a duration when each port is turned on and an average power during a transmission process.

18. The operation control device of an energy router according to claim 15, wherein the processor is further configured to:

perform at least one of alternating current conversion or voltage conversion according to an energy attribute of a port of the plurality of ports which input energy and an energy attribute of a port which output energy, wherein the energy attribute comprises direct current, alternating current, and voltage value.

* * * * *